Sept. 23, 1969    R. W. LOGAN    3,468,350
COMBINED BLADE GUARD AND DEPTH GAGE FOR A PORTABLE RADIAL SAW
Filed March 9, 1967    2 Sheets-Sheet 2
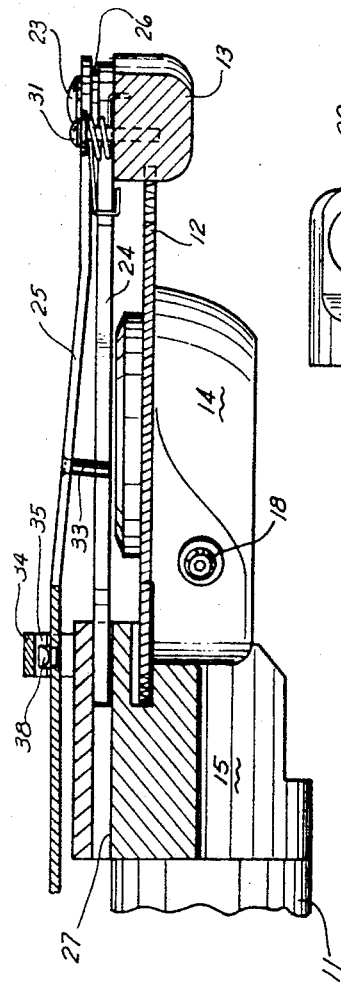
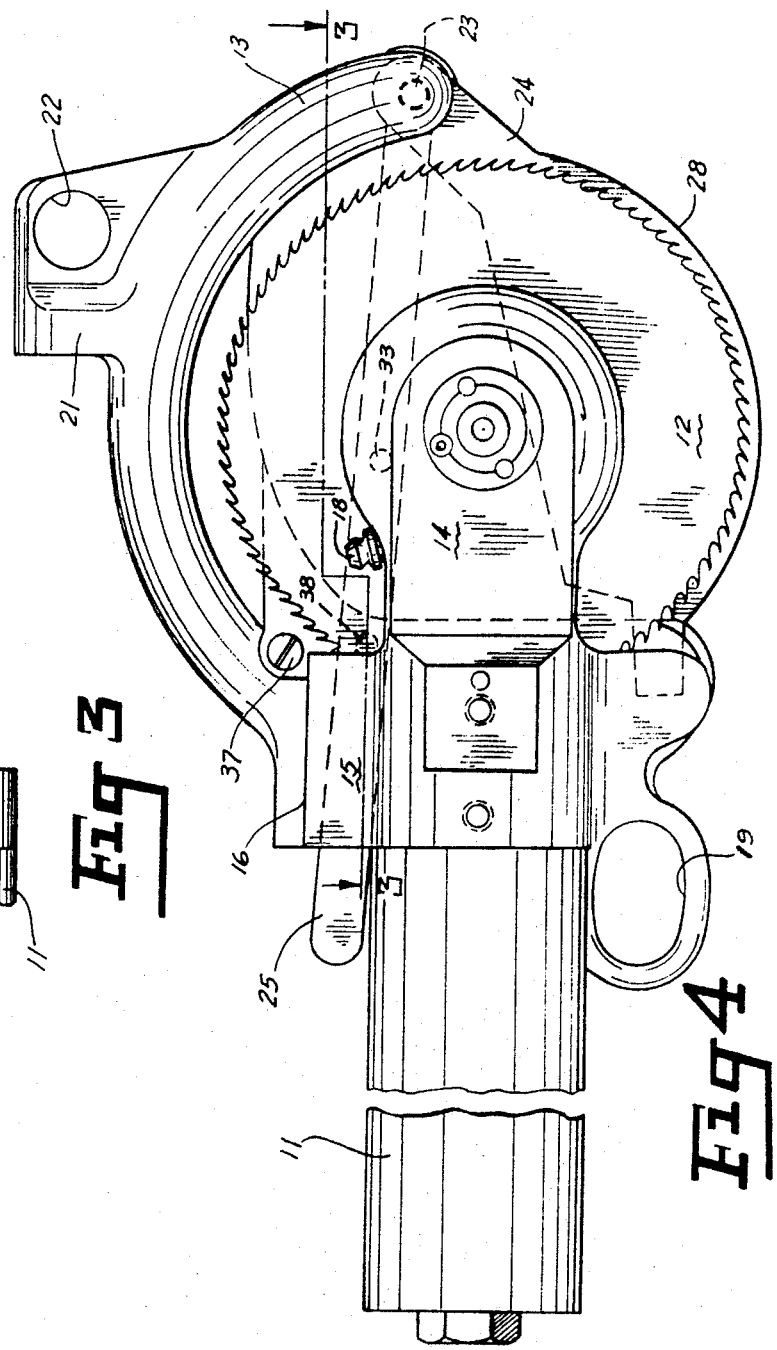
RICHARD W. LOGAN
INVENTOR.
BY Stephen E. Rockwell
ATTORNEY United States Patent Office 3,468,350
Patented Sept. 23, 1969

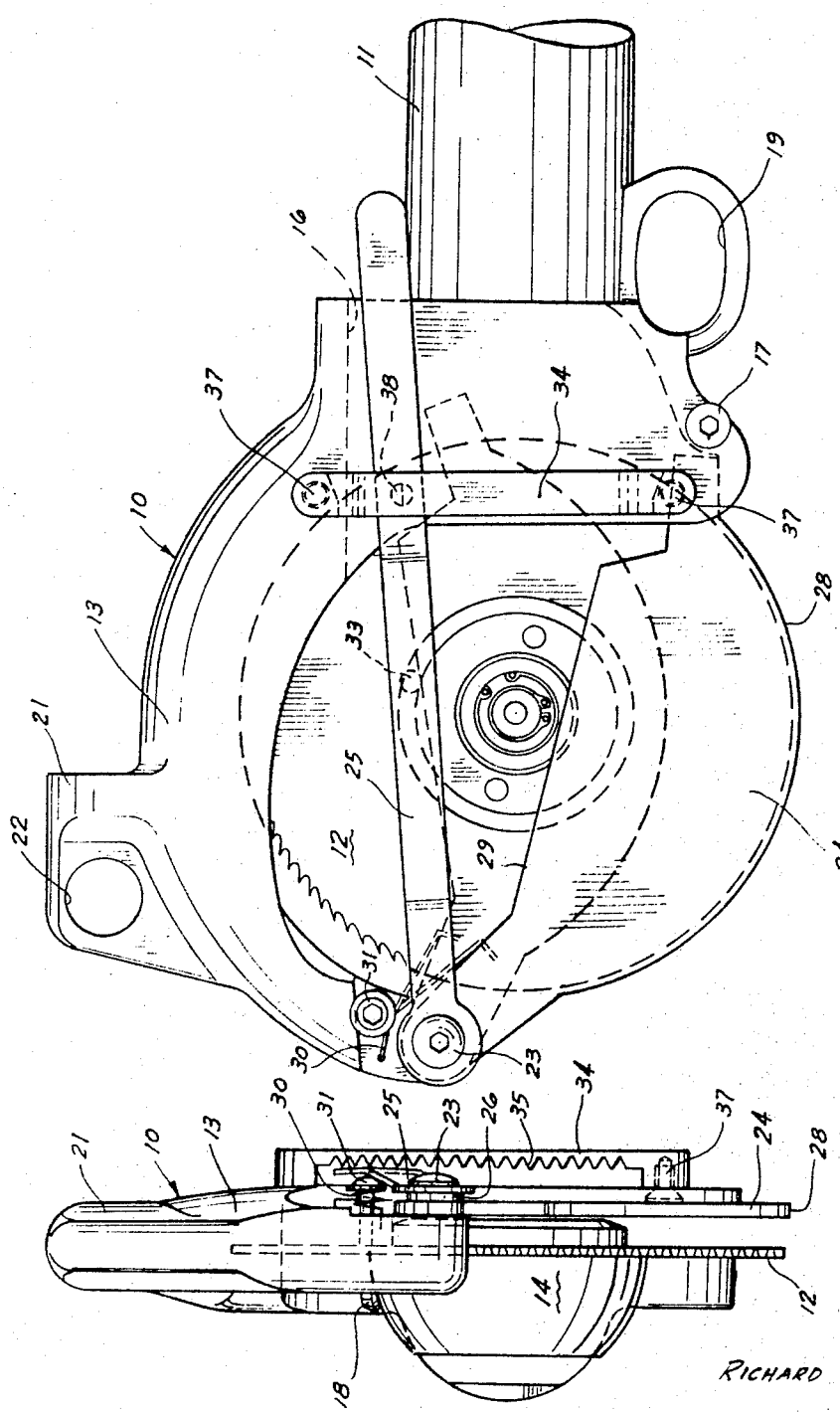

3,468,350
COMBINED BLADE GUARD AND DEPTH GAGE FOR A PORTABLE RADIAL SAW
Richard W. Logan, York, Maine, assignor to Packers Development Corporation, Rochester, N.H.
Filed Mar. 9, 1967, Ser. No. 621,955
Int. Cl. B27b 9/02, 5/28
U.S. Cl. 143—43          1 Claim

ABSTRACT OF THE DISCLOSURE

There is provided in a hand-held power saw having a blade of the circular type for making cuts to varying depths in a single sawing operation, a blade-guarding and depth-gaging member pivotally supported on a frame and spring urged in a direction to extend beyond the blade and a control lever, cooperating with said member, also pivoted to the frame for swinging movement to determine the extent of exposure of the blade and operable by the operator's thumb during a sawing operation to vary the depth of the cut.

---

This invention relates to a combined guard and depth gage for a portable radial saw especially useful, but not limited to employment, in the meat-packing industry. Such saws are commonly used for scribing the carcasses of animals, in which operation it is at least desirable that the saw be provided for adjustment by the operator of the depth of the cut. The cutting process requires cuts of varying depths by a tool which is held in one of the operator's hands while the other hand is left free from the saw for use on or against the carcass of the animal being cut.

Heretofore it has been proposed in such saw constructions to provide as a part of the saw an adjustable depth gage which may be adjusted by the thumb of the operator's hand holding the tool. This leaves the other hand of the operator free as aforesaid. However, in at least one previously known saw construction (see U.S. Patent 2,987,084, issued June 6, 1961) including a depth gage such as characterized above, there is no provision made for a guard for the exposed portion of the blade, when a cut is not being made, or to effectively guard the blade at least from one side thereof at all times while a cut is being made, regardless of the depth of the cut.

One object of the invention is to provide an improved combined blade guard and depth gage for a portable radial saw of the type operated by one hand of the user, leaving the other hand free, which provides for adjustment of the depth of the cut through a control member operable by the thumb of the hand of the operator supporting the saw.

Another object is to provide in a combined guard and depth gage construction a single element which serves a guard function and a gage function, which is self-moving to its guard position.

Still another object of the invention is to provide a combined guard and depth gage of simple construction which is very effective in use, and is economical to manufacture. Further objects of the invention will be apparent from the following detailed description of the presently preferred form of the invention illustrated in the drawings.

In the drawings:

FIG. 1 is a front end elevational view illustrating the head of a portable radial saw embodying the invention;

FIG. 2 is a fragmentary side elevational view of the tool looking at the head from the right as viewed in FIG. 1;

FIG. 3 is a sectional view taken on line 3—3 of FIG. 4; and

FIG. 4 is a broken, site elevational view of the tool showing the site thereof opposite that shown in FIG. 2.

In the drawings there is illustrated a portable, radial power saw, suitable for operation and manipulation by one hand of the user, having a head of composite form indicated generally at 10, extending from a tubular body portion 11 suitable for support by one hand of the user. The circular blade of the saw is indicated at 12 and is shown mounted for rotary movement in a plane parallel to the median plane of the body 11 which forms the handle of the tool.

As shown, the composite head 10 includes a generally arcuate frame part 13 formed as a metal casting which overlies a portion of the blade 12 in the manner best shown in FIGS. 1, 2 and 3 so as to provide a partial guard for the blade.

As shown in FIG. 4, the head 10 also includes a frame part 14 of elongated form having a base portion 15 thereof received in a recess 16 in the frame part 13 and secured thereto by suitable fasteners, one such fastener being indicated at 17.

In the illustrated form the body 11 of tubular form is received in the base portion 15 of the frame part 14; that is, it has an end portion which extends into the base portion 15. For this purpose the two elements may have a threaded connection and be further detachably secured to one another by suitable fasteners extending transversely of the base portion 15.

The blade 12 may be detachably connected (FIG. 2) to a stub shaft rotatably supported in the frame part 14 transversely thereof and provided with suitable antifriction devices lubricated from a lubricant nipple 18. Any conventional shafting and gearing may be employed for driving the blade 12 and extends into the frame part 14. The driving mechanism may also extend into the tubular handle 11 constituting a housing. The driving mechanism may be powered electrically or powered by fluid means, all in a conventional manner. The driving connections are not shown.

The aforementioned base portion 15 of the frame part may be provided as shown with means defining a hole or aperture 19 through which the forefinger of the operator's hand may be extended when the tool is grasped. The frame part 13 adjacent its upper extremity and forward end thereof may be provided with a flange 21 defining an opening 22 in the form of an eye by which the tool may be suspended when not in use as by a suitably supported stationary hook, not shown.

At the forward extremity of the frame part 13, as shown in FIG. 2, there is provided a headed fastener 23 which may have a part thereof threaded into the frame 13. The fastener 23 constitutes a pivot for one element 24 of the combined guard and depth gage and for another element 25 thereof which fastener 23, together with a washer 26 (FIG. 1) and the frame part 13, locates the elements 24 and 25 axially of their pivot points. The fastener 23 provided a common pivotal axis for the elements 24 and 25.

The element 24 of the combined blade guard and depth gage is elongated, as shown in FIG. 2, and has reduced end portions, one of which is pivoted as aforesaid by the fastener 23. The other end of the element 24 is received for vertical swinging movement, as viewed in FIG. 2, in an opening defined between the frame parts 13 and 14, indicated at 27 and best shown in FIG. 3. This opening 27, or rather the means defining the opening 27, provides a guide and lower stop for the swinging movement of the element 24 about its pivotal axis. It will be understood that it is a guide only in the broad sense in that it limits angular deflection of the element 24, as viewed in FIG. 2, about an axis generally lengthwise of the tool. Intermediate of its ends the element 24, which is of platelike form, is enlarged as illustrated in FIG. 2 and has an outer peripheral edge portion 28 which is of arcuate form and which, as shown in the last-mentioned view, of form on a radius somewhat greater than the radius of the saw blade 12.

As previously indicated, the edge 28 may be considered one side of the elongated element 24. The other side of the element 24 comprises a generally planar surface 29 constituted by an edge portion of the platelike element 24. The edge 29 has the inclination to the median plane of the tool shown in FIG. 2 when the element 24 is in its blade-guarding position shown in the last-mentioned view.

When the guard element 24 is in the last-mentioned position thereof, it will be noted that it extends beyond the periphery of the blade 12 and also extends well toward and approaching the rotary axis of the blade 12. In this position of the guard element 24, the right-hand end of the last-mentioned element abuts the aforementioned stop provided by the lower extremity of the means defining the opening 27 between the frame parts 13 and 14. The guard element 24, which also forms a part of the depth gage as will appear more fully hereinafter, is biased to the last-mentioned position thereof by a hair spring 30 supported by a stud 31 intermediate of its ends, which stud may take the form of a bolt such as that shown in FIG. 3, for example, secured in the frame part 13 and having its body portion extending outwardly therefrom.

It will be noted that this stud 31 extends in parallelism to the rotary axis of the blade. One end of the hair spring is fixed to the frame part 13 as by extending into a blind hole formed therein for the purpose. Intermediate of its ends the spring element 30 is coiled about and supported by the stud 31. The other end of the spring 30 overlies the last-mentioned edge of the guard element 24 a distance from the pivot provided by the member 23.

The arrangement is such that the spring 31 effectively biases the guard element 24 toward the position shown in FIG. 2. The spring-biased pivotal element 24 cooperates with the aforementioned pivotal element 25 to provide the cutting head with a depth gage. The element 25 is elongated in the manner shown in FIG. 2 and has one end thereof supported in the aforementioned manner on the pivot provided by the fastener 23 at one end of the element 25, the washer 26 being disposed between the elements 24 and 25 on the fastener 23. As shown in FIG. 2, the leverlike control element 25, which may be formed of steel and which by its nature is resilient, extends well rearwardly to a position wherein it sright-hand end, as viewed in FIG. 2, is readily accessible to the thumb of the hand of the operator gripping the tool.

The free end of the lever 25 is resiliently urged by virtue of the mounting fastener 23 and a bend in the lever, in a direction to the right, as viewed in FIG. 1, and the control lever carries approximately midway between its ends a transverse stud 33 secured thereto for cooperation with the edge portion 29 of the element 24. The stud 33 serves as an abutment to limit swinging movement of the element 24 in a counterclockwise direction, as viewed in FIG. 2. In the adjusted position of the lever 25, shown in the last-mentioned view, the element 24 is swingable in the last-mentioned direction against the influence of the spring 30 to the phantom position thereof shown in broken lines wherein it abuts the stud 33.

For adjustment of the control lever 25 and to provide a support for the right-hand end portion thereof as viewed in FIG. 2, a gage element 34 is employed which is of squared-off C shape. Intermediate of its ends, in the portion thereof which is vertically arranged as shown in FIG. 1, the adjustment element 34 is provided with teeth 35, and the element 34 is disposed in embracing relation to the lever element 25 with the teeth 35 thereof extending toward the lever element 25. The gage element 34 has its ends arranged in opposing relation to the frame part 13 and secured thereto as by suitable fasteners 37. To selectively cooperate with the teeth 35 of the gage element 34, the lever element 25 is provided with a tooth 38 disposed transversely thereof in a manner to extend from the side of the lever 24 in opposing relation to the gage element 34. The tooth 38 may be conveniently welded to the element 25.

The operation of the combined blade guard and depth gage will be readily understood from the foregoing description. When the portable radial saw is not in use, the pivoted guard 24 extends over the teeth of the saw blade in the manner illustrated in FIGS. 1, 2 and 4 under the influence of the spring 30 against the pressure of which the pivoted guard 24 may be deflected as aforesaid. The spring pressure on the guard element 24 tends to inhibit accidental dislocation of the guard in a manner to expose the teeth of the saw blade in a manner to cause injury to the person and to inhibit foreign objects from striking the teeth of the saw in such a way as to damage or mutilate them.

Prior to use of the saw, the operator may adjust the resilient lever 25 controlling the depth of the cut to be made by depressing the outer end of the lever 25 nearest the operator's hand in a direction toward the left, as viewed in FIG. 1, so that the tooth 38 carried by the lever 25 is disengaged from the teeth 35 of the gange element 34. When it is so disengaged, the lever 25 may be adjusted with reference to the gage element 34 on the pivotal axis of the lever 25 toward or away from the edge portion 29 of the element 24 of the combined blade guard and depth gage.

When the lever 25 is in the desired angular position, the control lever 25 may be released by the operator so as to engage certain of the teeth 35 of the gage element 34 and be held thereby in adjusted position. As the saw is moved toward and against the work, the carcass of an animal to be scribed, the element 24 of the combined blade guard and depth gage is engaged by the work and deflected on its aforementioned pivotal axis provided by the fastener 23 to permit the teeth of the saw to perform the necessary scribing action, the element 24 of the blade guard and depth gage being deflected in this manner against the pressure of the spring 30.

As previously indicated, the degree of pivotal deflection of the element 24 on its pivotal axis will depend upon the setting of the control lever 25. When the latter is in the position shown in FIG. 2, the element 24 may be deflected from the full-line position shown in the last-mentioned view to the broken-line position thereof, in which further deflection or angular movement of the element 24 in a blade-exposing direction is prevented by the abutment 33 on the control lever, which is then engaged with the edge portion 29 of the element 24.

It will be appreciated from the disclosure in FIG. 2 that as the depth gage 24 is deflected by engagement with the carcass of the animal as the blade cuts deeper into the carcass until the gage has reached the broken-line position of the last-mentioned view, for example, it constantly tends to prevent foreign matter or the operator's fingers from moving laterally against the blade 12 from the side of the blade on which the gage is disposed, thereby guarding the blade and, in the phantom position of FIG. 2, extending over the hub mounting the blade. It will thus be seen that, while serving a gaging function, the element 24 simultaneously performs a guarding function.

It will be understood that during the use of the tool, that is, without first terminating the drive of the blade of the saw or putting the tool down or disengaging the tool from the animal carcass, the depth of the cut made in the carcass may be varied by changing the degree of permissible deflection of the element 24 on its aforesaid pivotal axis by manipulation of the control lever 25 using the thumb of the hand of the tool operator which supports the tool.

It will also be understood from the foregoing that there is provided in a simple, economical construction a combined blade guard and depth gage which is very effective in each of its functions. The depth gage may be readily adjusted as will be understood from the foregoing.

While only one form of the combined blade guard and depth gage for a portable radial saw has been illustrated in the drawings and described above, it will be apparent to those versed in the art that the combination may take other forms and is susceptible of various changes in details without departing from the principles of the invention.

What is claimed is:

1. In a hand-held saw, having a circular power-driven blade supported on a frame associated with a handle in parallelism and adjacent the blade for making cuts to varying depths in a single sawing operation, the frame having a stationary portion thereof extending over a portion of the blade to guard the latter, the combination of a blade-guarding and depth-gaging member of plate-like form pivotally supported on the frame, having an edge portion extensible beyond the blade when the member is undeflected and being spring urged toward this position, and coacting with the frame to be limited in its movement in the last-mentioned direction, said member being engageable with the work to be deflected thereby against said bias, and a control lever pivoted to the frame for movement independently of said member to swing in a plane in parallelism to the plane in which the latter swings, the lever having intermediate of its ends abutment means coacting with abutment means on said member to be engaged by and limit said deflection of said member in any selected one of a plurality of angularly adjusted positions of the lever to control the degree of exposure of the blade, the frame and said lever having coacting detent means for holding said lever in a selected one of said positions, the lever being resilient and urged in a plane transverse to said swinging plane thereof so so as to be normally held in one of these positions, and the lever having an axial extension accessible to the operator's thumb of the hand gripping the handle so that said lever may be depressed and angularly adjusted during a sawing operation to vary the depth of the cut.

References Cited

UNITED STATES PATENTS

| 2,987,084 | 6/1961 | Mandell | 143—159.6 |
| 3,221,783 | 12/1965 | Kaltenmark et al. | 143—43 |

ANDREW R. JUHASZ, Primary Examiner

JAMES F. COAN, Assistant Examiner

U.S. Cl. X.R.

143—159